(12) United States Patent
McClenny et al.

(10) Patent No.: US 8,159,334 B2
(45) Date of Patent: Apr. 17, 2012

(54) SYSTEM AND METHOD OF COMMUNICATING EMERGENCY ALERTS

(75) Inventors: John McClenny, San Antonio, TX (US);
Thomas Webster, Mystic, CT (US);
Michael Thomas Raftelis, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/069,612

(22) Filed: Mar. 23, 2011

(65) Prior Publication Data

US 2011/0214142 A1 Sep. 1, 2011

Related U.S. Application Data

(60) Division of application No. 12/395,219, filed on Feb. 27, 2009, now Pat. No. 7,936,254, which is a continuation of application No. 11/510,850, filed on Aug. 25, 2006, now Pat. No. 7,515,036.

(51) Int. Cl.
*G08B 9/00* (2006.01)

(52) U.S. Cl. .............. 340/286.02; 340/531; 340/534; 340/539.11; 340/539.13; 340/539.19; 340/7.48; 340/631; 455/184.1; 455/186.1; 455/192.3; 455/404.1; 725/33; 725/61; 725/105; 725/108; 725/131

(58) Field of Classification Search ............ 340/286.02, 340/531, 534, 539.11, 539.13, 539.19, 7.48, 340/361; 455/184.1, 186.1, 192.3, 404, 1; 725/33, 61, 105, 108, 131
See application file for complete search history.

(56) References Cited

U.S. PATENT DOCUMENTS

| | | | |
|---|---|---|---|
| 5,121,430 A | 6/1992 | Ganzer et al. | |
| 5,917,887 A | 6/1999 | Fesler et al. | |
| 6,204,761 B1 | 3/2001 | Vanderable | |
| 7,050,784 B2 | 5/2006 | Clark | |
| 7,126,454 B2 * | 10/2006 | Bulmer | 340/286.01 |
| 7,683,792 B2 * | 3/2010 | Araiza-Boys | 340/601 |
| 2005/0229207 A1 | 10/2005 | Kendall et al. | |
| 2005/0273809 A1 | 12/2005 | Kendall et al. | |
| 2006/0020992 A1 | 1/2006 | Pugel et al. | |

* cited by examiner

*Primary Examiner* — Tai T Nguyen
(74) *Attorney, Agent, or Firm* — Toler Law Group, PC

(57) ABSTRACT

A tangible computer readable medium includes instructions executable by a processor to cause the processor to communicate with a multicast alert server to receive a multicast emergency alert message via a multicast-enabled network of an Internet Protocol television system. The multicast emergency alert message includes data related to a location code and data related to a set-top box action. The computer program further includes instructions to execute the set-top box action when the location code matches location information stored at a set-top box device.

20 Claims, 5 Drawing Sheets

SYSTEM AND METHOD OF COMMUNICATING EMERGENCY ALERTS

CLAIM OF PRIORITY

This application is a divisional patent application of, and claims priority from, U.S. patent application Ser. No. 12/395,219, filed on Feb. 27, 2009 and entitled "SYSTEM AND METHOD OF COMMUNICATING EMERGENCY ALERTS," now U.S. Pat. No. 7,936,254, which is a continuation patent application of, and claims priority from, U.S. patent application Ser. No. 11/510,850, filed on Aug. 25, 2006 and entitled "SYSTEM AND METHOD OF COMMUNICATING EMERGENCY ALERTS," now U.S. Pat. No. 7,515,036, each of which is hereby incorporated by reference in its entirety.

FIELD OF THE DISCLOSURE

The present disclosure relates generally to communicating emergency alerts.

BACKGROUND

Television viewing is part of daily life for many people. The wealth of content available from television service providers allows many people to find entertaining and informative programming despite their varying interests. As a result, television also provides a source of communication for government officials to provide emergency alerts and information. Most emergency alerts pertain to a specific geographic location within a television viewing area. Because television viewing areas can cover multiple locations, such as multiple counties, many viewers will receive emergency alerts that do not apply to them. Some systems attempt to determine which viewers should receive an emergency alert prior to transmission, and the alert is unicast to those viewers. However, such unicast connections can require extensive resources and can prevent scalability of a television service network. Hence, there is a need for a system and method of communicating emergency alerts.

DETAILED DESCRIPTION OF THE DRAWINGS

According to an embodiment, a tangible computer readable medium includes instructions executable by a processor to cause the processor to communicate with a multicast alert server to receive a multicast emergency alert message via a multicast-enabled network of an Internet Protocol television system. The multicast emergency alert message includes data related to a location code and data related to a set-top box action. The computer program also includes instructions to execute the set-top box action when the location code matches location information stored at a set-top box device.

According to an embodiment, a non-transitory computer readable medium includes instructions executable by a processor to cause the processor to send a multicast emergency alert message to a first set-top box device at a first location and to a second set-top box device at a second location via a multicast-enabled network. The multicast emergency alert message includes data related to a set-top box action and data related to a location code. The first set-top box device executes the set-top box action when the location code corresponds to the first location, and the second set-top box device executes the set-top box action when the location code corresponds to the second location.

Figure 1:
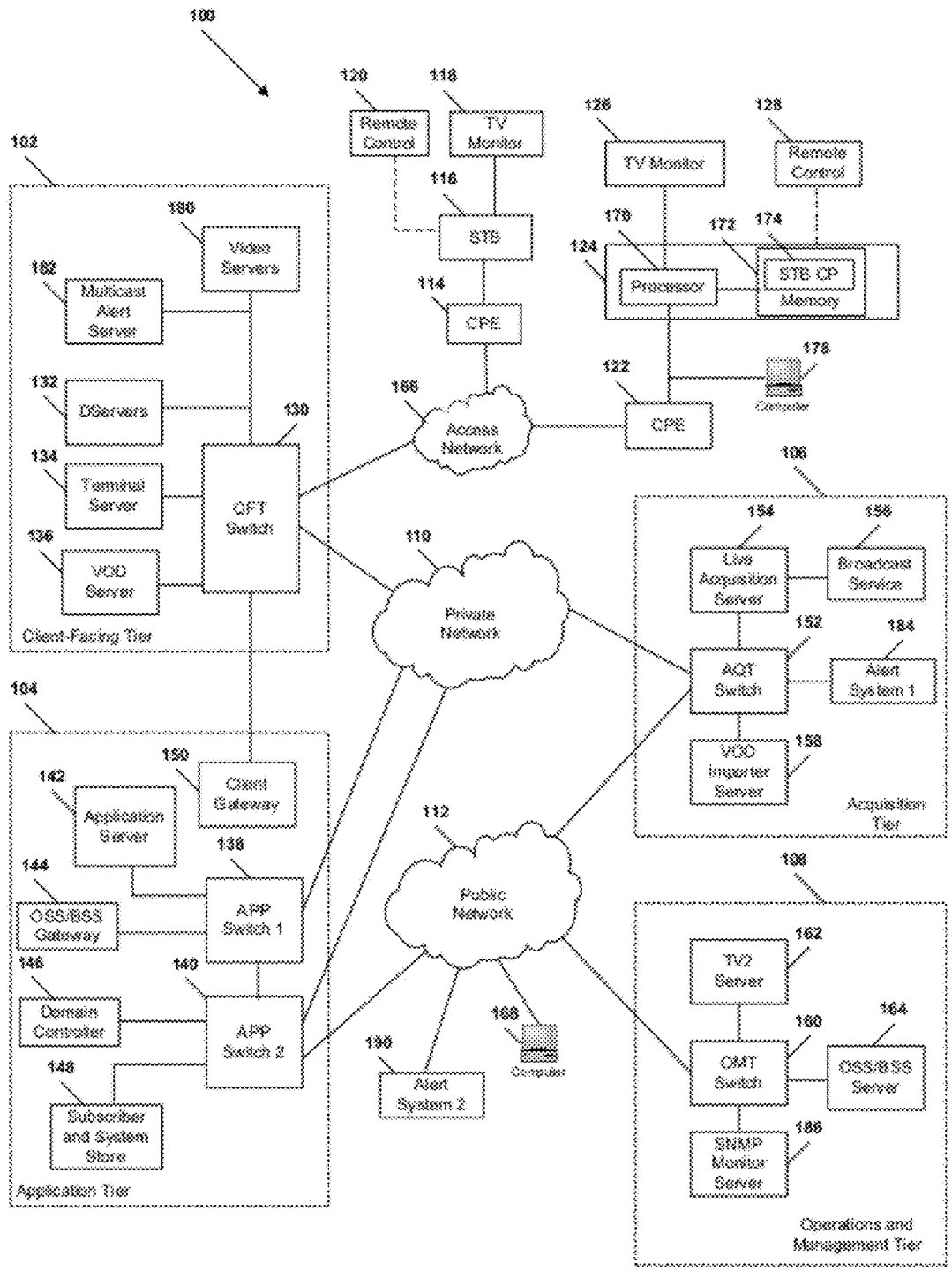
FIG. 1 is a block diagram of a particular illustrative embodiment of a system to communicate emergency alerts.

Referring to FIG. 1, an illustrative embodiment of an Internet Protocol Television (IPTV) system that may be used to communicate emergency alerts is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

The client-facing tier 102 can communicate with user equipment via an access network 166, such as an Internet Protocol Television (IPTV) access network. In an illustrative embodiment, customer premises equipment (CPE) 114, 122 can be coupled to a local switch, router, or other device of the access network 166. The client-facing tier 102 can communicate with a first representative set-top box device 116 at a first customer premise via the first CPE 114 and with a second representative set-top box device 124 at a second customer premise via the second CPE 122. In a particular embodiment, the CPE 114, 122 can communicate with computing devices at customer premises, such as the computing device 178 coupled to the second CPE 122. The CPE 114, 122 can include routers, local area network devices, modems, such as digital subscriber line (DSL) modems, any other suitable devices for facilitating communication between a set-top box device and the access network 166, or any combination thereof.

In a particular embodiment, the client-facing tier 102 can be coupled to the CPE 114, 122 via fiber optic cables. Alternatively, the CPE 114, 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the access network 166, via an IPTV software platform, such as Microsoft® TV IPTV Edition.

The first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device 124 can communicate with a second remote control 128. The set-top box devices 116, 124 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 116, 124 can receive data, video, or any combination thereof, from the client-facing tier 102 via the access network 166 and render or display the data, video, or any combination thereof, at the display device 118, 126 to which it is coupled. In an illustrative embodiment, the set-top box devices 116, 124 can include tuners that receive and decode television programming signals or packet streams for transmission to the display devices 118, 126. Further, the set-top box devices 116, 124 can include a STB processor 170 and a STB memory device 172 that is accessible to the STB processor 170. In one embodiment, a computer program, such as the STB computer program 174, can be embedded within the STB memory device 172.

In an illustrative embodiment, the client-facing tier 102 can include a client-facing tier (CFT) switch 130 that manages communication between the client-facing tier 102 and the access network 166 and between the client-facing tier 102 and the private network 110. As illustrated, the CFT switch 130 is coupled to one or more data servers, such as D-servers 132, that store, format, encode, replicate, or otherwise manipulate or prepare video content for communication from the client-facing tier 102 to the set-top box devices 116, 124. The CFT switch 130 can also be coupled to a terminal server 134 that provides terminal devices with a connection point to the private network 110. In a particular embodiment, the CFT switch 130 can be coupled to a video-on-demand (VOD) server 136 that stores or provides VOD content imported by the IPTV system 100.

Further, the CFT switch 130 is coupled to one or more video servers 180 that receive video content and transmit the content to the set-top boxes 116, 124 via the access network 166. In a particular embodiment, the CFT switch 130 can be coupled to one or more multicast alert servers 182 that receive emergency alerts from an emergency alert system (EAS) receiver, such as a first emergency alert system 184 and a second emergency alert system 190, and send multicast emergency alert messages that are based on the emergency alerts to the set-top box devices 116, 124.

In an illustrative embodiment, the client-facing tier 102 can communicate with a large number of set-top boxes, such as the representative set-top boxes 116, 124 over a wide geographic area, such as a metropolitan area, a viewing area, a statewide area, a regional area, a nationwide area or any other suitable geographic area, market area, or subscriber or customer group that can be supported by networking the client-facing tier 102 to numerous set-top box devices. In a particular embodiment, the CFT switch 130, or any portion thereof, can include a multicast router or switch that communicates with multiple set-top box devices via a multicast-enabled network.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the access network 166, which enable the set-top box devices 116, 124 to provide functions, such as display, messaging, processing of IPTV data and VOD material, etc. In an illustrative embodiment, the application server 142 can provide location information to the set-top box devices 116, 124. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

The second APP switch 140 can be coupled to a domain controller 146 that provides Internet access, for example, to users at their computers 168 via the public network 112. For example, the domain controller 146 can provide remote Internet access to IPTV account information, e-mail, personalized Internet services, or other online services via the public network 112. In addition, the second APP switch 140 can be coupled to a subscriber and system store 148 that includes account information, such as account information that is associated with users who access the IPTV system 100 via the private network 110 or the public network 112. In an illustrative embodiment, the subscriber and system store 148 can store subscriber or customer data and create subscriber or customer profiles that are associated with IP addresses of corresponding set-top box devices 116, 124.

In a particular embodiment, the application tier 104 can include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto. In an illustrative embodiment, the set-top box devices 116, 124 can access the IPTV system 100 via the access network 166, using information received from the client gateway 150. User devices can access the client gateway 150 via the access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the access network 166.

For example, when the first representative set-top box device 116 accesses the client-facing tier 102 via the access network 166, the client gateway 150 can verify subscriber information by communicating with the subscriber and system store 148 via the private network 110. Further, the client gateway 150 can verify billing information and status by communicating with the OSS/BSS gateway 144 via the private network 110. In one embodiment, the OSS/BSS gateway 144 can transmit a query via the public network 112 to the OSS/BSS server 164. After the client gateway 150 confirms subscriber and/or billing information, the client gateway 150 can allow the set-top box device 116 to access IPTV content and VOD content at the client-facing tier 102. If the client gateway 150 cannot verify subscriber information for the set-top box device 116, e.g., because it is connected to an unauthorized twisted pair, the client gateway 150 can block transmissions to and from the set-top box device 116 beyond the access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television content, movie content, advertisement content, other video content, or any combination thereof, from a broadcast service 156, such as a satellite acquisition system or satellite head-end office. In a particular embodiment, the live acquisition server 154 can transmit content to the AQT switch 152, and the AQT switch 152 can transmit the content to the CFT switch 130 via the private network 110.

In an illustrative embodiment, content can be transmitted to the D-servers 132, where it can be encoded, formatted, stored, replicated, or otherwise manipulated and prepared for communication from the video server(s) 180 to the set-top box devices 116, 124. The CFT switch 130 can receive content from the video server(s) 180 and communicate the content to the CPE 114, 122 via the access network 166. The set-top box devices 116, 124 can receive the content via the CPE 114, 122, and can transmit the content to the television monitors 118, 126. In an illustrative embodiment, video or audio portions of the content can be streamed to the set-top box devices 116, 124.

Further, the AQT switch 152 can be coupled to a video-on-demand importer server 158 that receives and stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the access network 166 to the VOD server 136, via the CFT switch 130. Upon receiving such requests, the VOD server 136 can retrieve the requested VOD content and transmit the content to the set-top box devices 116,124 across the access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

In an illustrative, non-limiting embodiment, the AQT switch 152 can be coupled to a first emergency alert system 184, such as an EAS off-air receiver that receives emergency alerts from a national weather service, an emergency broadcast system, or another emergency alert service. In an alternative embodiment, the first emergency alert system 184 can be coupled to the CFT switch 130, to the multicast alert server 182, or to the terminal server 134. In an illustrative, non-limiting embodiment, a second emergency alert system 190 can be coupled to the public network 112.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 186 that monitors network devices within or coupled to the IPTV system 100. In a particular embodiment, the OMT switch 160 can communicate with the AQT switch 152 via the public network 112.

In an illustrative embodiment, the live acquisition server 154 can transmit content to the AQT switch 152, and the AQT switch 152, in turn, can transmit the content to the OMT switch 160 via the public network 112. In this embodiment, the OMT switch 160 can transmit the content to the TV2 server 162 for display to users accessing the user interface at the TV2 server 162. For example, a user can access the TV2 server 162 using a personal computer 168 coupled to the public network 112.

In a particular illustrative embodiment, an emergency alert is received at the first emergency alert system 184. The emergency alert can be a weather alert, a civil defense alert, an Amber alert, a Presidential alert, or any other emergency alert. In a particular embodiment, the emergency alert can indicate one or more geographic areas to which the emergency alert applies, such as a street, city, zip code, area code, county, state, region, time zone, nation, or other geographic area. The emergency alert can also include emergency alert information, such as the type of emergency, a degree of urgency associated with the emergency, safety precaution instructions, other emergency alert information, or any combination thereof In an illustrative embodiment, the first emergency alert system 184 can communicate the emergency alert to the multicast alert server(s) 182 over the private network via the AQT switch.

In another particular embodiment, an emergency alert can be received at the second emergency alert system 190. The emergency alert can be received at the second emergency alert system 190 from an emergency alert service, for example, via radio transmission. Alternatively, the emergency alert can be received at the second emergency alert system 190 via the public network 112, for instance, from a web browser or web server application operating at a user computing device 168, such as customer computing device, a local law enforcement computing device (e.g., for Amber alerts), a local government agency computing device, or other computing device that can issue emergency alerts related to a specific geographic area. In an illustrative embodiment, the second emergency alert system 190 can send a unicast message including the emergency alert to the multicast alert server 182 over the public network 112 via the AQT switch 152 or the second APP switch 140.

The multicast alert server(s) 182 can generate a multicast emergency alert message based on an emergency alert that it receives from the first emergency alert system 184, the second emergency alert system 190, or any combination thereof (e.g., in the case of multiple redundant alerts). In a particular embodiment, the multicast emergency alert message includes data related to a location code and data related to an action to be taken by a set-top box device. The location code(s) can indicate one or more geographic areas to which the emergency alert received from the first emergency alert system 184 applies. For instance, the location code can indicate streets, zip codes, area codes, cities, counties, states, regions, time zones, nations, or other geographic areas. In another embodiment, the location code(s) can indicate one or more IP addresses of set-top box devices in the intended geographic area(s).

The multicast emergency alert message can also include data related to any emergency alert information included with the emergency alert received from the first emergency alert system 184. In an illustrative embodiment, the multicast alert server(s) 182 can format the multicast emergency alert message to be sent via a multicast-enabled network to a plurality of set-top box devices in multiple geographic areas.

In an illustrative embodiment, the access network 166 can be a multicast-enabled network that communicates with a plurality of set-top boxes in multiple geographic areas. For example, the first representative set-top box device 116 can be at a customer premise in a first geographic area, and the second representative set-top box device 124 can be at a customer premise in a second geographic area. The multicast alert server(s) 182 can multicast the multicast emergency alert message to all set-top box devices communicating with the access network 166.

In a particular embodiment, each set-top box device that communicates with the multicast-enabled network can include location information. The location information can indicate a geographic area of the customer premise at which the set-top box device is located, one or more geographic areas for which a user of the set-top box device is to be alerted regarding an emergency, or any combination thereof. For example, the first representative set-top box device 116 can include location information related to a geographic area of the first customer premise, and the second representative set-top box device 124 can include location information related to a geographic area of the second customer premise. In another example, each set-top box device can include location information related to nearby geographic areas, geographic areas of one or more relatives of users of the set-top box device, or additional geographic areas other than that of the customer premise at which each set-top box device is located.

Location information can be included at the set-top box devices 116, 124 in a variety of ways. For example, an installer that installs a set-top box device at a customer premise can enter location information at the time of installation. Alternatively, the set-top box device can receive the location information from the OSS/BSS server 164, the subscriber and system store 148, or any combination thereof, when a user account associated with a set-top box device is created.

In a particular embodiment, the set-top box devices 116, 124 can determine upon powering up whether they have current location information, if any. A set-top box device can issue a request via the multicast-enabled network to receive location information. In an illustrative embodiment, a server of the IPTV system 100, such as the multicast alert server(s) 182, the application server 142, OSS/BSS server 164, the subscriber and system store 148, or any combination thereof, can determine location information related to the set-top box device, based on an IP address of the set-top box device, a geographic location of the set-top box device, location information selected by a customer associated with the set-top box device, or any combination thereof. The location information can be sent to the requesting set-top box device via the multicast-enabled network.

In an illustrative embodiment, when a set-top box device, such as the first representative set-top box device 116, receives a multicast emergency alert message from the multicast alert server(s) 182 via the multicast-enabled network, the set-top box device 116 determines a location code indicated by data included with the multicast emergency alert message and compares the location code with the location information stored at the set-top box device 116. If the location code matches the location information, the set-top box device can execute a set-top box action indicated by data included with the multicast emergency alert message. A set-top box action can include requesting video content of a target channel from a video server 180 of the IPTV system 100; transmitting such video content to a television monitor 118; producing an audio alert via a speaker or other audio element of the set-top box device 116 or television monitor 118; producing a visual alert via a light, light-emitting diode (LED), or other visual element of the set-top box device 116; sending emergency alert information included with the multicast emergency alert message to the television monitor 118, such as scrolling text overlaying video content; or any combination thereof.

In a particular embodiment, when another set-top box device in another geographic location, such as the second representative set-top box device 124, receives the same multicast emergency alert message from the multicast alert server(s) 182 via the multicast-enabled network, the set-top box device 124 can determine the location code indicated by data included with the multicast emergency alert message and compare the location code with the location information stored at the set-top box device 124. If the set-top box device 124 determines that the location code does not match the location information stored at the set-top box device 124, the set-top box device can delete or otherwise discard the multicast emergency alert message received from the multicast alert server(s) 182.

In a particular embodiment, a computing device can be coupled to customer premise equipment at a customer premise where a set-top box device is located. For example, a computing device 176 can be coupled to the second customer premise equipment 122 at the second customer premise where the second representative set-top box device 124 is located. In an illustrative embodiment, the computing device 176 can download and store location information from the multicast alert server(s) 182 or application server 142 via the multicast-enabled network, the public network, or any combination thereof. The computing device 176 can receive multicast emergency alert messages sent by the multicast alert server(s) 182 via the second customer premise equipment 122. The computing device 176 can compare a location code indicated by data of a multicast emergency alert message and can indicate that a multicast emergency alert message has been received at the second representative set-top box device 124, for example. In another embodiment, the computing device can display emergency alert information, such as text, audio, video, or any combination thereof.

Figure 2:
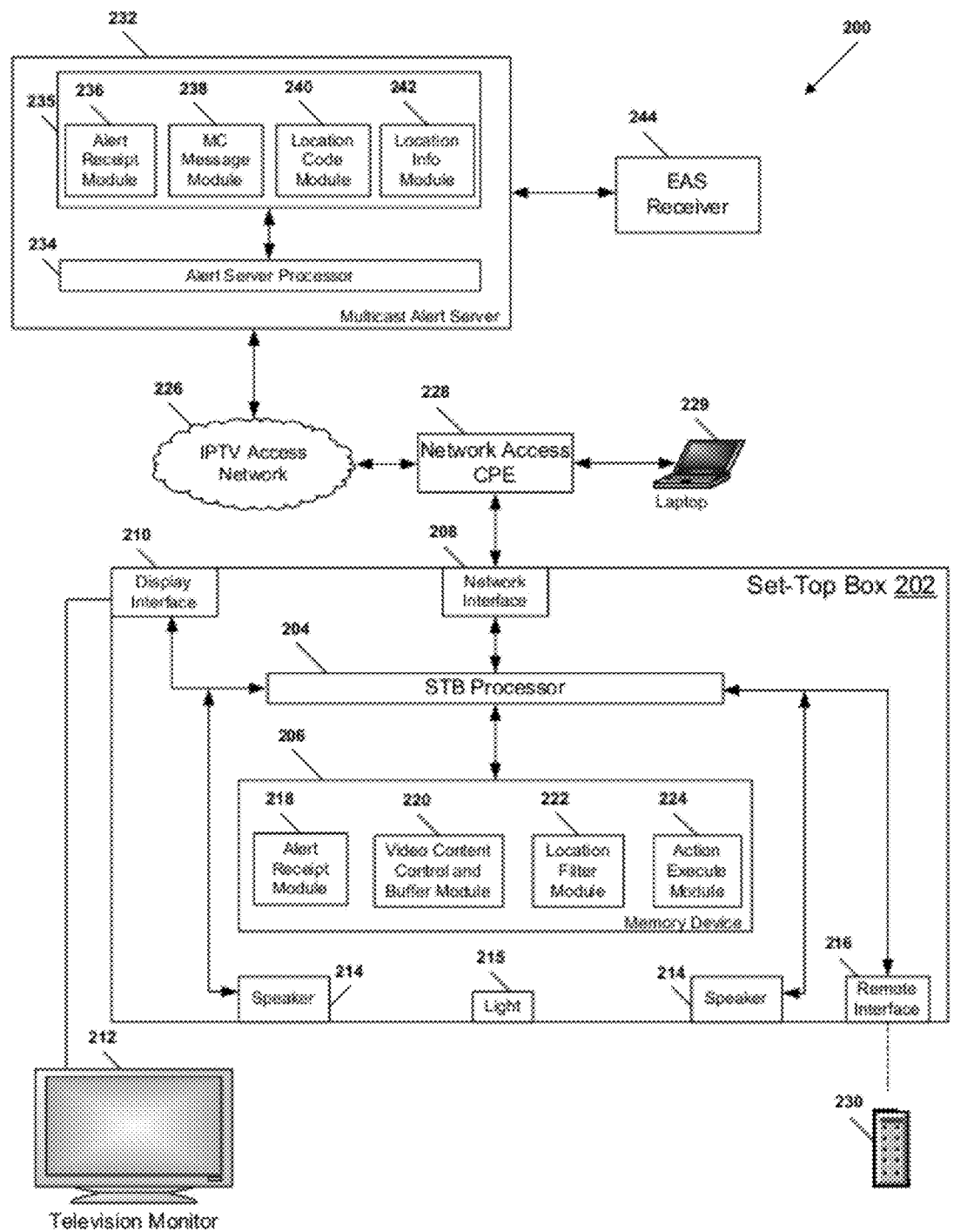
FIG. 2 is a block diagram of a second particular illustrative embodiment of a system to communicate emergency alerts.

Referring to FIG. 2, a second particular embodiment of a system to communicate emergency alerts is illustrated and designated generally at 200. The system 200 includes a set-top box device 202 that communicates with a multicast alert server 232 of an Internet Protocol Television (IPTV) system via a multicast-enabled IPTV access network 226. Further, the multicast alert server 232 communicates with an emergency alert system (EAS) receiver 244. In addition, a computing device 229 can communicate with the multicast alert server 232 via the IPTV access network 226 via the network access customer premises equipment 228.

As indicated in FIG. 2, the set-top box device 202 includes a STB processor 204 and a memory device 206 accessible to the STB processor 204. In an illustrative, non-limiting embodiment, the STB processor 204 can communicate with the IPTV access network 226, via the network interface 208.

In a particular embodiment, network access customer premises equipment (CPE) 228 can facilitate communication between the network interface 208 and the IPTV access network 226. The network access CPE 228 can include a router, a local area network device, a modem, such as a digital subscriber line (DSL) modem, any other suitable device for facilitating communication between the network interface 208 of the set-top box device 202 and the IPTV access network 226, or any combination thereof. Further, the STB processor 204 can communicate video content and emergency alert information to a display device 212 via a display interface 210. In addition, the STB processor 204 can receive commands from a remote control device 230 via a remote interface 216.

In a particular embodiment, the memory device 206 can include an alert receipt module 218 that is executable by the STB processor 204 to receive multicast emergency alert messages from the multicast alert server 232. In an illustrative embodiment, the alert receipt module 218 can be executable by the STB processor 204 to listen to the IPTV access network 226 for such messages. Further, the memory device 206 can include a video content control and buffer module 220 that is executable by the STB processor 204 to receive video content via the IPTV access network 226 and to buffer the video content before transmitting it to the display interface 210, in order to prevent underflow.

In an illustrative embodiment, the memory device 206 can include a location filter module 222 that is executable by the STB processor 204 to store location information related to one or more geographic areas for which a user of the set-top box device 202 is to be alerted about emergencies. Further, the location filter module 222 is executable by the STB processor 204 to determine a location code indicated by data of a multicast emergency alert message and to compare the location code with the location information stored at the set-top box device 202. Location information can be stored at the location filter module 222 when the set-top box device 202 is installed at a customer premise; when an account associated with the set-top box device 202 is created; upon request from the set-top box device 202, for example, upon powering up; or any combination thereof.

In a particular embodiment, the memory device 206 can include an action execute module 224 that is executable by the STB processor 204 to determine a set-top box action indicated by data of the multicast emergency alert message and to execute the set-top box action when a location code indicated by data of the multicast emergency alert message matches location information stored at the set-top box device 202. For example, the action execute module 224 can be executable by the STB processor 204 to request video content of a particular channel from a video server; to transmitting particular video content to the display device 212; to produce an audio alert via a speaker 214 or other audio element of the set-top box device 202 or the display device 212; producing a visual alert via a light 215, light-emitting diode (LED), or other visual element of the set-top box device 202; sending emergency alert information included with the multicast emergency alert message to the display device 212, such as scrolling text overlaying video content; or any combination thereof.

In a particular embodiment, the location filter module 222 can be executable by the STB processor 204 to determine whether location information is stored at the set-top box device 202. For example, the location filter module 222 can be executable by the STB processor 204 to determine, upon the set-top box device 202 powering up or switching to an activated mode, whether location information is stored at the memory device 206. In an illustrative embodiment, the location filter module 222 can be executable by the STB processor 204 to determine whether any location information stored at the set-top box device 202 is current. If no location information, or non-current location information, is stored at the set-top box device 202, the location filter module 222 can be executable by the STB processor 204 to request location information from the multicast alert server 232 or another server via the IPTV access network 226 and to store location information received via the IPTV access network 226.

In a particular embodiment, the multicast alert server 232 can include an alert server processor 234. The multicast alert server 232 can also include a multicast server memory device 235. The multicast server memory device 235 can include an alert receipt module 236 that is executable by the alert server processor 234 to communicate with the EAS receiver 244 via the Internet, a private network of the IPTV system, or any combination thereof, to receive emergency alerts. In an illustrative embodiment, the multicast server memory device 235 can include a multicast message module 238 that is executable by the alert server processor 234 to determine one or more intended geographic locations of an emergency alert and to determine a set-top box action based on an emergency alert. Further, the multicast message module 238 can be executable by the alert server processor 234 to generate a multicast emergency alert message based on the emergency alert received from the EAS receiver 244. The multicast emergency alert message can include data related to a location code that corresponds to the intended location(s) and data related to the determined set-top box action. In a particular embodiment, the multicast emergency alert message can also include data related to emergency alert information received with the emergency alert, such as a type of emergency, a degree of urgency of an emergency, safety precaution instructions, an elimination or ceasing of the emergency, a path or direction of the emergency, or any combination thereof.

The multicast message module 238 is executable by the alert server processor 234 to multicast emergency alert messages to a plurality of set-top box devices, including the set-top box device 202, via the IPTV access network 226. The plurality of set-top box devices can include all set-top box devices communicating with the IPTV access network 226, or any portion of such set-top box devices. In an illustrative embodiment, the multicast message module 238 can be executable by the alert server processor 234 to multicast emergency alert messages to a computing device 229 coupled to the network access customer premise equipment 228 at a customer premise where one of the plurality of set-top box devices is located.

In a particular embodiment, the multicast server memory device 235 can include a location code module 240 that associates various location codes with various geographic locations of set-top box devices with which the multicast alert server 232 communicates. In an illustrative embodiment, location codes can include federal information protocol standards (FIPS) codes, proprietary location codes, other location codes, or any combination thereof.

In a particular embodiment, the multicast server memory device 235 can include a location information module 242 that is executable by the alert server processor 234 to receive and process a request from a set-top box device, such as the set-top box device 202, for location information. In an illustrative embodiment, the location information module 242 can be executable by the alert server processor 234 to determine location information for a requesting set-top box device based on an IP address associated with the requesting set-top box device, a twisted pair associated with the requesting set-top box device, a customer account associated with the requesting set-top box device, or any combination thereof The location information module 242 is executable by the alert server processor 234 to send the determined location information to the requesting set-top box device via the IPTV access network 226.

In a particular embodiment, the location information module 242 can be executable by the alert server processor 234 to receive and process a request from a computing device, such as the computing device 229, for location information. In an illustrative embodiment, the location information module 242 can be executable by the alert server processor 234 to determine location information for a requesting computing device based on an IP address associated with the requesting computing device, a twisted pair associated with the requesting computing device, a customer account associated with the requesting computing device, or any combination thereof The location information module 242 is executable by the alert server processor 234 to send the determined location information to the requesting computing device via the IPTV access network 226.

In an illustrative embodiment, the various modules 218-224 and 236-242 can include logic, hardware, computer instructions, or any combination thereof.

Figure 3:
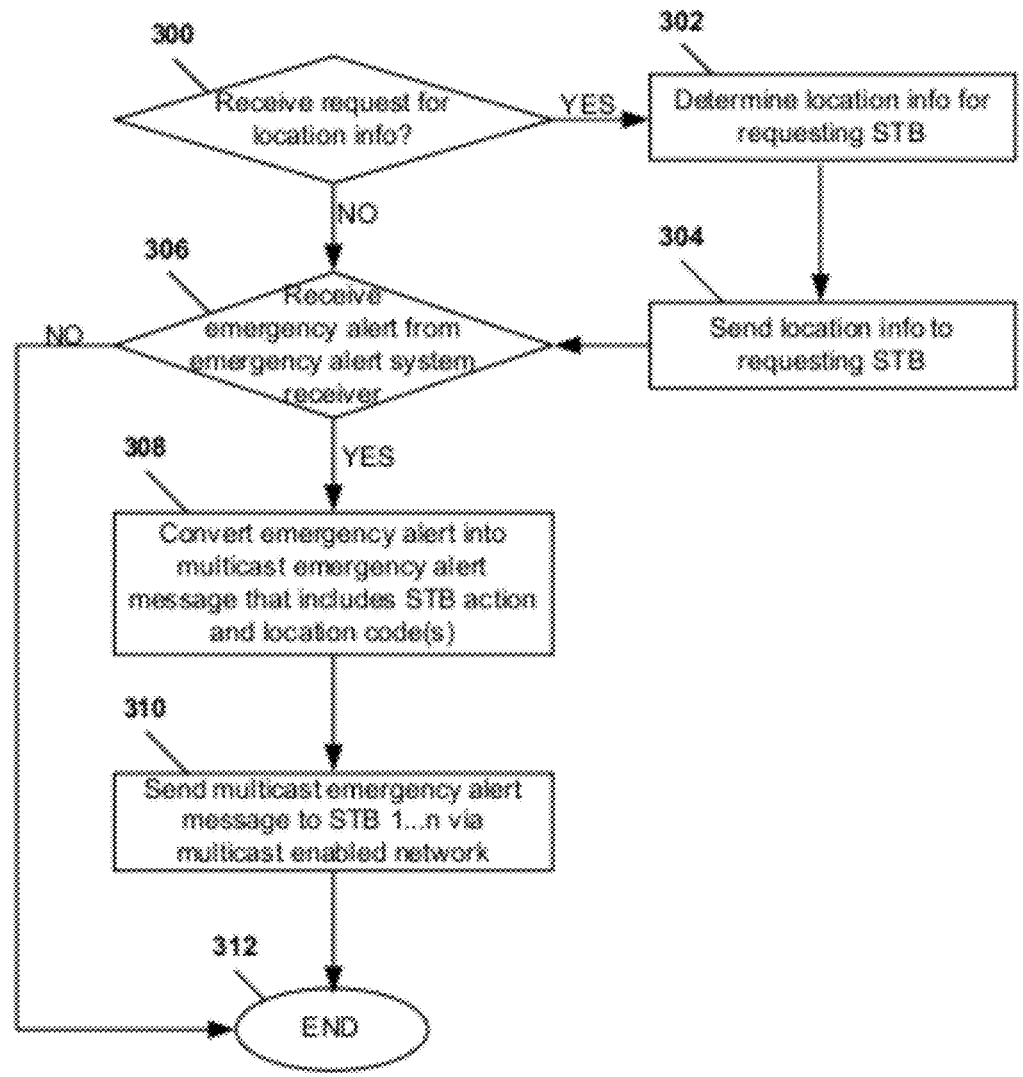
FIG. 3 is a flow diagram of a particular illustrative embodiment of a method of communicating emergency alerts.

Referring to FIG. 3, a particular illustrative embodiment of a method of communicating emergency alerts is illustrated. At decision step 300, a multicast alert server of an Internet Protocol Television (IPTV) system determines whether it has received a request for location information from a set-top box device. If the multicast alert server determines that it has not received a request for location information from a set-top box device, the method proceeds to decision step 306. Conversely, if the multicast alert server determines that it has received a request for location information from a set-top box device, the method moves to block 302, and the multicast alert server determines location information corresponding to the requesting set-top box device. At block 304, the multicast alert server sends the location information to the requesting set-top box device. The method then moves to decision step 306.

The location information can indicate a geographic area of the customer premise at which the set-top box device is located, one or more geographic areas for which a user of the set-top box device is to be alerted regarding an emergency, or any combination thereof In an illustrative embodiment, the multicast alert server can determine location information for a requesting set-top box device based on an IP address associated with the requesting set-top box device, a geographic location associated with the requesting set-top box device, a twisted pair associated with the requesting set-top box device, a customer account associated with the requesting set-top box device, or any combination thereof.

At decision step 306, the multicast alert server determines whether it has received an emergency alert from an emergency alert system (EAS) receiver. The emergency alert can be a weather alert, a civil defense alert, an Amber alert, a Presidential alert, or any other emergency alert. In a particular embodiment, the emergency alert can indicate one or more geographic areas to which the emergency alert applies, such as a street, city, zip code, area code, county, state, region, time zone, nation, or other geographic area. In an illustrative embodiment, the emergency alert can also include emergency alert information, such as the type of emergency, a degree of urgency associated with the emergency, safety precaution instructions, other emergency alert information, or any combination thereof In an illustrative embodiment, the emergency alert can be received via a public Internet Protocol (IP) network, such as the Internet, via a private network of the IPTV system, or any combination thereof.

If the multicast alert server determines that it has not received an emergency alert, the method terminates at 312. On the other hand, if the multicast alert server determines that it has received an emergency alert, the method continues to block 308. At block 308, in a particular embodiment, the multicast alert server converts the emergency alert into a multicast emergency alert message that includes data related to a set-top box action and data related to a location code. In a particular embodiment, the multicast emergency alert message can include data related to any emergency alert information included with the emergency alert received from the EAS receiver. In an illustrative embodiment, the multicast alert server can format the multicast emergency alert message to be sent via a multicast-enabled network.

Moving to block 310, the multicast alert server sends the multicast emergency alert message to a plurality of set-top box devices via a multicast-enabled network of the IPTV system. The set-top box devices can be in different geographic areas and can include all set-top box devices communicating with the multicast-enabled network, or one or more groups of set-top box devices communicating with the multicast-enabled network. Each set-top box device can determine a location code based on data of the multicast emergency alert message and can compare the location code to location information stored at the set-top box device. If the location code matches the location information, the set-top box device can execute the set-top box action indicated in data of the multicast emergency alert message. The method terminates at 312.

Figure 4:
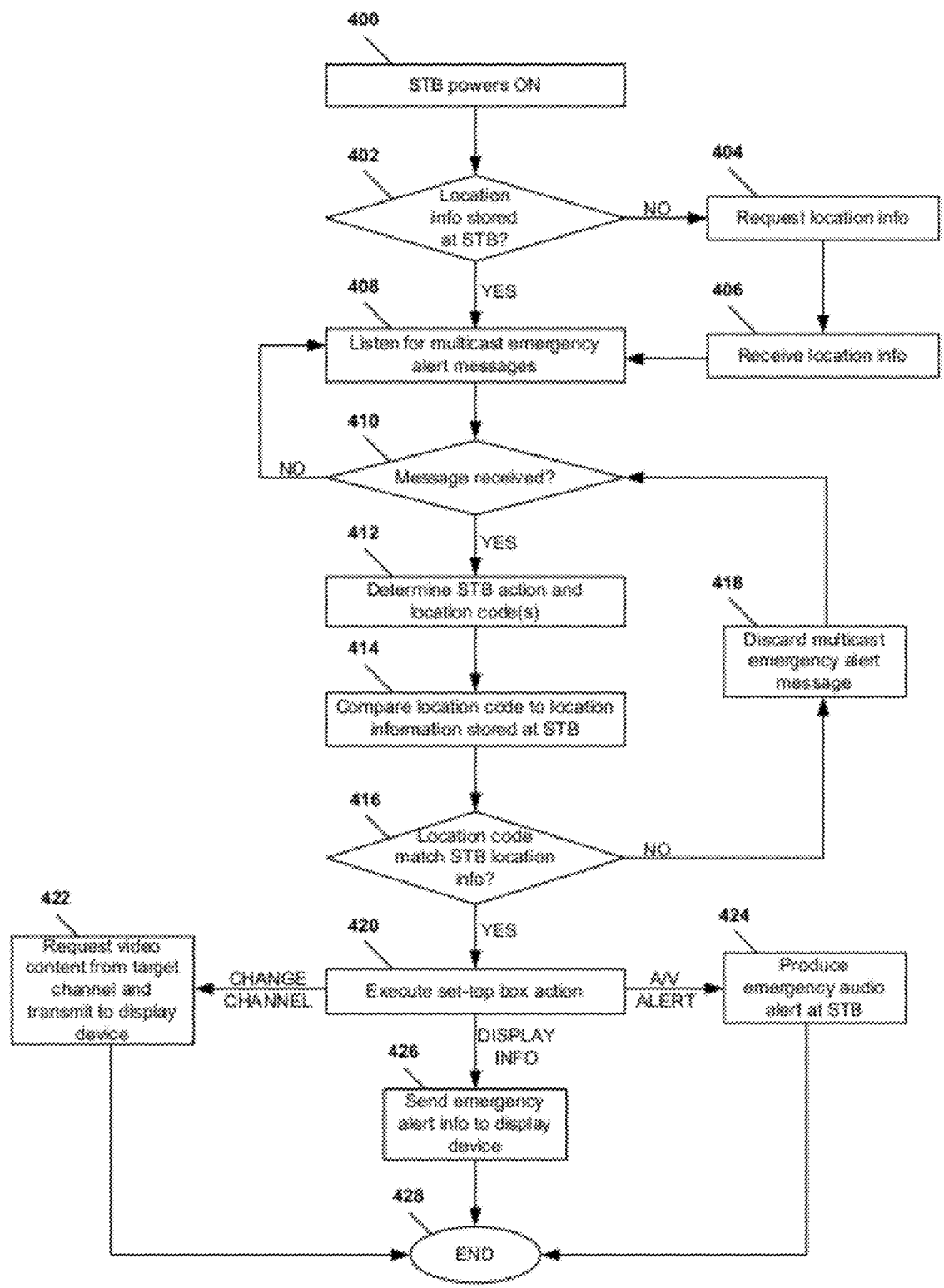
FIG. 4 is a flow diagram of a second particular illustrative embodiment of a method of communicating emergency alerts.

Referring to FIG. 4, a second particular illustrative embodiment of a method of communicating emergency alerts is illustrated. At block 400, a set-top box powers on or comes to an activated state. Moving to decision step 402, in a particular embodiment, the set-top box device determines whether location information is stored at the set-top box device. If the set-top box device determines that location information is stored at the set-top box device, the method proceeds to block 408. On the other hand, if the set-top box device determines that location information is not stored at the set-top box device, or location information stored at the set-top box device is not current, the method moves to block 404, and the set-top box device requests location information from a server, such as an application server or multicast alert server, of an Internet Protocol Television (IPTV) system via a multicast-enabled network of the IPTV system. The method continues to block 406, and the set-top box device receives the location information.

At block 408, in a particular embodiment, the set-top box device listens for multicast emergency alert messages on the IPTV network. Proceeding to decision step 410, the set-top box device can determine whether it has received a multicast emergency alert message from a multicast alert server of the IPTV system via the IPTV network. If the set-top box device determines that it has not received a multicast emergency alert message, the method returns to block 408, and the set-top box device continues to listen for multicast emergency alert messages on the IPTV network. If the set-top box device determines that it has received a multicast emergency alert message, the method advances to block 412, and the set-top box device determines a set-top box action and a location code from data of the multicast emergency alert message.

Moving to block 414, the set-top box device compares the determined location code with location information stored at the set-top box device. The method continues to decision step 416, and the set-top box device determines whether the determined location code matches the location information. In an illustrative embodiment, if the set-top box device determines that the determined location code does not match the location information, the method moves to block 418, and the set-top box device can delete or otherwise discard the multicast emergency alert message. The method then returns to block 410 and continues.

Returning to decision step 416, if the set-top box device determines that the determined location code matches the location information, the method proceeds to block 420, and the set-top box device executes the set-top box action determined from data of the multicast emergency alert message. In one embodiment, the set-top box action can be a channel change action. For example, the emergency alert can be a Presidential or other government announcement televised on a particular channel. The method can move to block 422, and the set-top box device can request video content of the particular channel from a video server of the IPTV system and can send the video content to a display device coupled to the set-top box device.

In another embodiment, the set-top box action can be an audio/visual alert action. The method can move to block 424, and the set-top box device can produce an audio alert via a speaker or other audio element of the set-top box device or television monitor; produce a visual alert via a light, light-emitting diode (LED), or other visual element of the set-top box device; or any combination thereof.

In a further embodiment, the set-top box action can be an information display action. The method proceeds to block 426, and the set-top box device can send emergency alert information included with the multicast emergency alert message to the television monitor, such as scrolling text overlaying video content. The method terminates at 428.

In a particular embodiment, the steps of the methods described herein can be executed in the order shown by the figures. In alternative embodiments, some steps can be executed simultaneously or in alternative sequences.

In conjunction with the configuration of structure described herein, the system and method disclosed provide communication of emergency alerts. In a particular illustrative embodiment, an emergency alert is received at the EAS off-air receiver. The emergency alert can be a weather alert, a civil defense alert, an Amber alert, a Presidential alert, or any other emergency alert. In a particular embodiment, the emergency alert can indicate one or more geographic areas to which the emergency alert applies, such as a street, city, zip code, area code, county, state, region, time zone, nation, or other geographic area. The emergency alert can also include emergency alert information, such as the type of emergency, a degree of urgency associated with the emergency, safety precaution instructions, other emergency alert information, or any combination thereof.

The EAS off-air receiver communicates the emergency alert to one or more multicast alert servers of an Internet Protocol Television (IPTV) system. The multicast alert server(s) generate a multicast emergency alert message based on the emergency alert. In a particular embodiment, the multicast emergency alert message includes data related to a location code and data related to an action to be taken by a set-top box device. The location code(s) can indicate one or more geographic areas to which the emergency alert received from the EAS off-air receiver applies. For instance, the location code can indicate streets, zip codes, area codes, cities, counties, states, regions, time zones, nations, or other geographic areas. In another embodiment, the location code(s) can indicate one or more IP addresses of set-top box devices in the intended geographic area(s).

The multicast emergency alert message can also include data related to any emergency alert information included with the emergency alert received from the EAS off-air receiver. In an illustrative embodiment, the multicast alert server(s) can format the multicast emergency alert message to be sent via a multicast-enabled network of the IPTV system to a plurality of set-top box devices in multiple geographic areas.

In a particular embodiment, each set-top box device that communicates with the multicast-enabled network can include location information. The location information can indicate a geographic area of the customer premise at which the set-top box device is located, one or more geographic areas for which a user of the set-top box device is to be alerted regarding an emergency, or any combination thereof. For example, a set-top box device can include location information related to a geographic area of the customer premise at which the set-top box device located. In another example, each set-top box device can include location information related to nearby geographic areas, geographic areas of one or more relatives of users of the set-top box device, or additional geographic areas other than that of the customer premise at which each set-top box device is located.

In an illustrative embodiment, when a set-top box device receives a multicast emergency alert message from the multicast alert server(s) via the multicast-enabled network, the set-top box device determines a location code indicated by data included with the multicast emergency alert message and compares the location code with the location information stored at the set-top box device. If the location code matches the location information, the set-top box device can execute a set-top box action indicated by data included with the multicast emergency alert message. A set-top box action can include requesting video content of a particular channel from a video server of the IPTV system; transmitting such video content to a television monitor coupled to the set-top box device; producing an audio alert via a speaker or other audio element of the set-top box device or television monitor; producing a visual alert via a light, light-emitting diode (LED), or other visual element of the set-top box device; sending emergency alert information included with the multicast emergency alert message to the television monitor, such as scrolling text overlaying video content; or any combination thereof.

In a particular embodiment, when another set-top box device in another geographic location receives the same multicast emergency alert message from the multicast alert server(s) via the multicast-enabled network, the set-top box device can determine the location code indicated by data included with the multicast emergency alert message and compare the location code with the location information stored at the set-top box device. If the set-top box device determines that the location code does not match the location information stored at the set-top box device, the set-top box device can delete or otherwise discard the multicast emergency alert message received from the multicast alert server(s).

In a particular embodiment, a set-top box device can request location information. For example, a set-top box device can determine upon powering up that it does not have current location information, if any. The set-top box device can issue a request via the multicast-enabled network to receive location information. In an illustrative embodiment, a server of the IPTV system, such as the multicast alert server(s) or an application server, can determine location information related to the set-top box device and can send the location information to the requesting set-top box device via the multicast-enabled network.

In a particular embodiment, a computing device can be coupled to customer premise equipment at a customer premise where a set-top box device is located. In an illustrative embodiment, the computing device can download and store location information from the multicast alert server(s) or application server via the multicast-enabled network, a public network, such as the Internet, or any combination thereof. The computing device can receive multicast emergency alert messages sent by the multicast alert server(s) via the customer premise equipment. The computing device can compare a location code indicated by data of a multicast emergency alert message and can indicate that a multicast emergency alert message has been received at the set-top box device, for example. In another embodiment, the computing device can display emergency alert information, such as text, audio, video, or any combination thereof.

Figure 5:
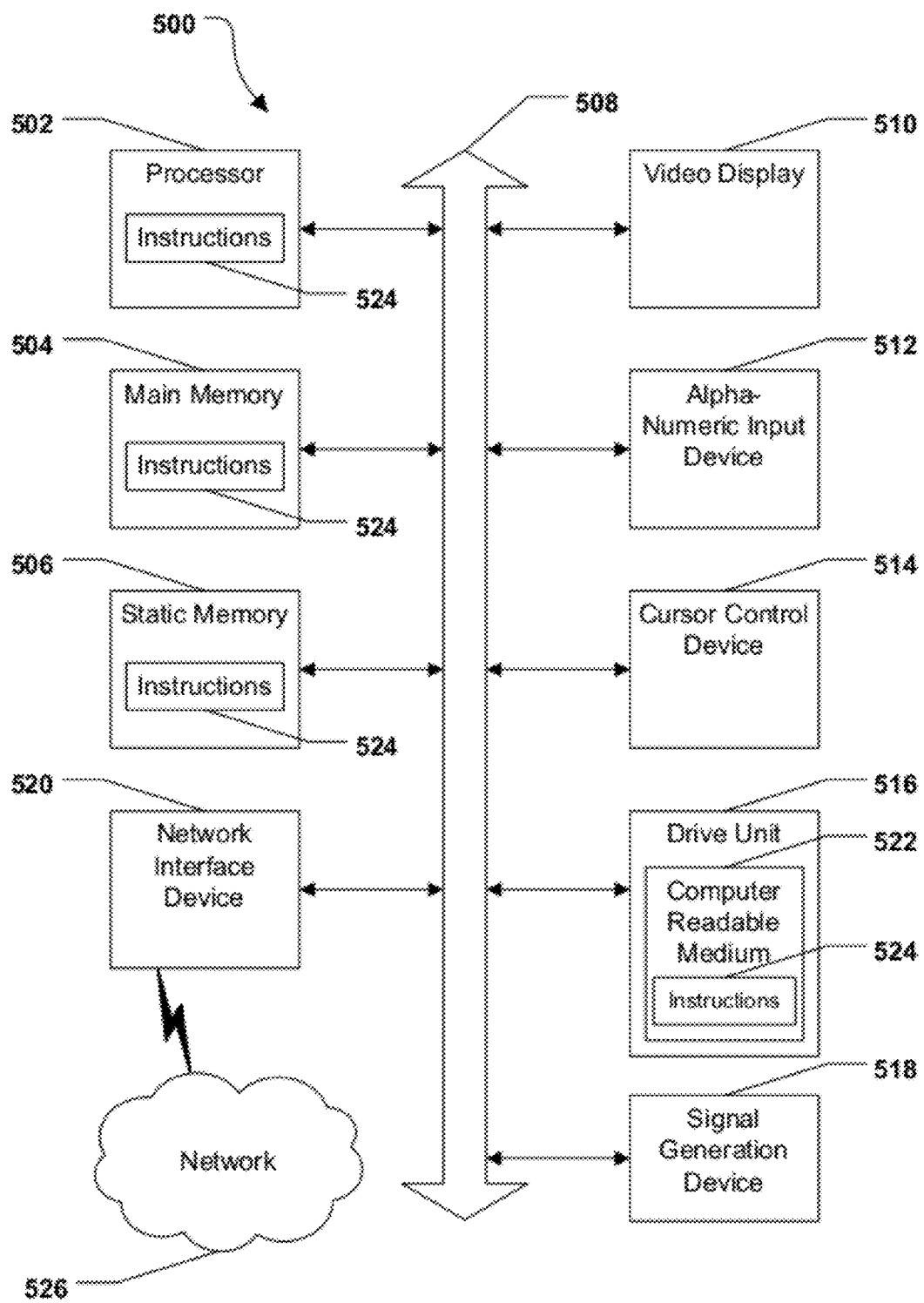
FIG. 5 is a diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices, including a server or set-top box device, as shown in FIGS. 1-2.

In a networked deployment, the computer system may operate in the capacity of an IPTV server, such as a video server or multicast alert server, or a set-top box device. The computer system 500 can also be implemented as or incorporated into various devices, such as an emergency alert system (EAS) receiver, a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device, such as a mouse. Further, the computer system 500 can include a wireless input device 515, e.g., a remote control device. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A non-transitory computer readable storage device medium including instructions executable by a processor to cause the processor to:
   communicate with a multicast alert server to receive a multicast emergency alert message at a set-top box device via a multicast-enabled network of an internet protocol television system, the multicast emergency alert message including data related to a location code and data related to a set-top box action; and
   execute the set-top box action when the location code matches location information stored at the set-top box device.

2. The non-transitory computer readable storage device of claim 1, wherein the location information includes an internet protocol address, a street, a city, a zip code, an area code, a county, a state, a time zone, a geographic region, a nation, or any combination thereof associated with the set-top box device.

3. The non-transitory computer readable storage device of claim 1, wherein the instructions are further executable by the processor to request the location information from an application server after the set-top box device powers on.

4. The non-transitory computer readable storage device of claim 1, wherein the instructions are further executable by the processor to provide a user notification indicating that the multicast emergency alert message has been received at the set-top box device.

5. The non-transitory computer readable storage device of claim 1, wherein the set-top box action includes requesting video content of a target channel from a server, transmitting video content to a television monitor, producing an audio alert, producing a visual alert, sending emergency alert information to a display device, or any combination thereof.

6. The non-transitory computer readable storage device of claim 1, wherein the location code is a federal information processing standards code.

7. The non-transitory computer readable storage device of claim 1, wherein the multicast-enabled network is a private access network of the Internet Protocol television system.

8. The non-transitory computer readable storage device of claim 1, wherein the instructions are further executable by the processor to display the multicast emergency alert message overlaying video content at a display device.

9. The non-transitory computer readable storage device of claim 1, wherein the instructions are further executable by the processor to determine whether the location information is stored at the set-top box device.

10. The non-transitory computer readable storage device of claim 1, wherein the set-top box device is configured to store the location information when the set-top box device is installed at a user premise.

11. A non-transitory computer readable storage device including instructions executable by a processor to cause the processor to:
send a multicast emergency alert message to a first set-top box device at a first location and to a second set-top box device at a second location via a multicast-enabled network, wherein the multicast emergency alert message includes data related to a set-top box action and data related to a location code,
wherein the first set-top box device executes the set-top box action when the location code corresponds to the first location, and the second set-top box device executes the set-top box action when the location code corresponds to the second location.

12. The non-transitory computer readable storage device of claim 11, wherein the location code is a federal information processing standards code.

13. The non-transitory computer readable storage device of claim 11, wherein the instructions are further executable by the processor to cause the processor to:
communicate with an emergency alert system receiver to receive an emergency alert; and
generate emergency alert information based on the emergency alert,
wherein data related to the emergency alert information is included with the multicast emergency alert message.

14. The non-transitory computer readable storage device of claim 13, wherein the emergency alert information includes a type of the multicast emergency alert message, a degree of urgency of the multicast emergency alert message, a time period related to the multicast emergency alert message, safety precaution instructions related to the multicast emergency alert message, a dissipation of an emergency, a path of the emergency, or any combination thereof.

15. The non-transitory computer readable storage device of claim 11, wherein the location code indicates an internet protocol address, a street, a city, a zip code, an area code, a county, a state, a time zone, a geographic region, a nation, or any combination thereof associated with the multicast emergency alert message.

16. The non-transitory computer readable storage device of claim 11, wherein the instructions are further executable by the processor to cause the processor to form the multicast emergency alert message to be transmitted via the multicast-enabled network.

17. The non-transitory computer readable storage device of claim 16, wherein sending the multicast emergency alert message comprises transmitting the formed multicast emergency alert message via the multicast-enabled network to the first set-top box device and to the second set-top box device.

18. The non-transitory computer readable storage device claim 11, wherein the multicast emergency alert message is to be displayed overlaying video content at a display device.

19. The non-transitory computer readable storage device of claim 11, wherein the multicast-enabled network is included in an internet protocol television system.

20. The non-transitory computer readable storage device of claim 19, wherein the multicast-enabled network is a private access network of the internet protocol television system.

* * * * *